United States Patent [19]
Tsuruta

[11] 3,876,490
[45] Apr. 8, 1975

[54] APPARATUS FOR HEAT-TRANSFER BETWEEN HOT GAS AND AQUEOUS SOLUTION

[75] Inventor: Hidemasa Tsuruta, Tokyo, Japan

[73] Assignee: Nittetu Chemical Engineering Ltd., Tokyo, Japan

[22] Filed: June 18, 1973

[21] Appl. No.: 370,703

[52] U.S. Cl............... 159/4 A; 159/16 A; 159/48 L
[51] Int. Cl........................... B01d 1/16; B01d 1/14
[58] Field of Search........ 159/4 A, 4 B, 13 A, 13 C, 159/16 A, 47 WL, 48 L, 4 R; 23/26 Z; 122/6.5; 261/DIG. 9

[56] References Cited
UNITED STATES PATENTS

| | | | |
|---|---|---|---|
| 2,934,410 | 4/1960 | Smith | 23/277 |
| 3,153,609 | 10/1964 | Markant et al. | 162/36 |
| 3,211,538 | 10/1965 | Gross et al. | 23/300 |
| 3,212,235 | 10/1965 | Markant | 159/4 A X |
| 3,349,546 | 10/1967 | Rogers | 55/227 |
| 3,404,954 | 10/1968 | Jeffes et al. | 23/165 D |

Primary Examiner—Jack Sofer
Attorney, Agent, or Firm—Lane, Aitken, Dunner & Ziems

[57] ABSTRACT

An apparatus for heat-transfer between a hot gas and an aqueous solution including means for combusting a material for producing a hot combustion gas, a duct connected at one end of the combustion means, and a concurrent flow gas-liquid contacting unit, such as a venturi scrubber and either an, empty tower or a packed tower hermetically connected with the other end of the duct. The apparatus is characterized by connecting means interposed between the duct and the contacting unit, a solution-injecting port opening into the contacting unit at a position below the connecting means for injecting an aqueous solution into the unit for direct contact with the hot gas therein, and a water-feeding port provided over the solution-injecting port.

5 Claims, 2 Drawing Figures

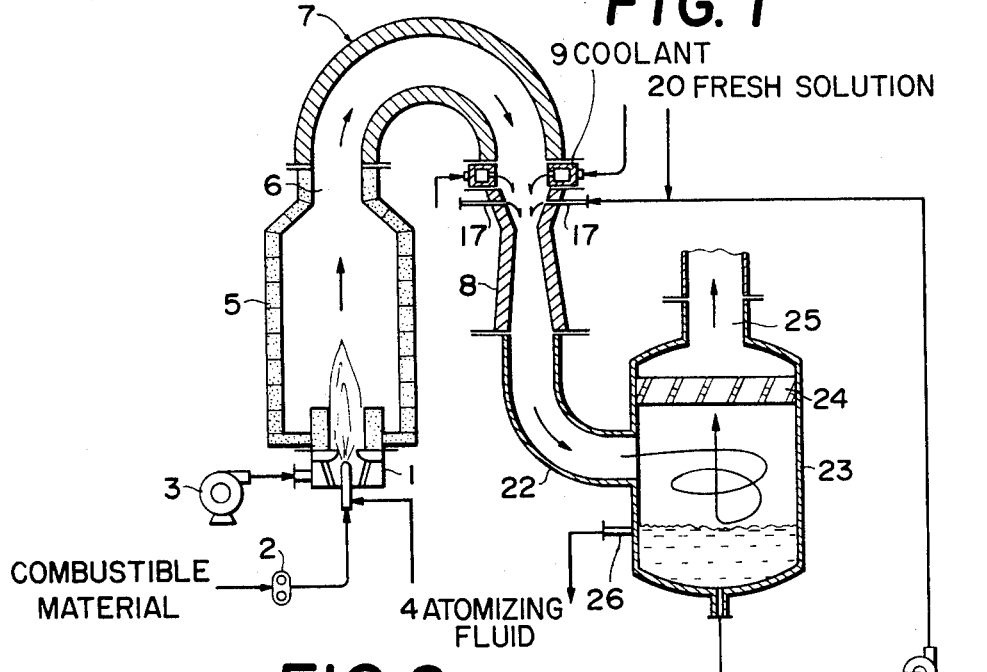
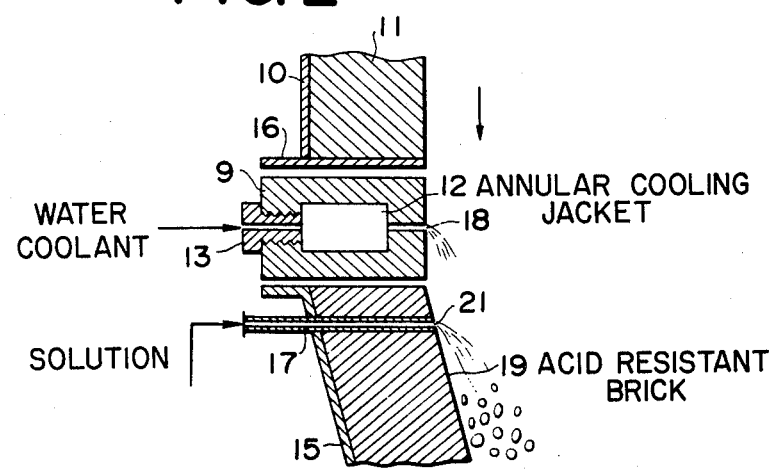

APPARATUS FOR HEAT-TRANSFER BETWEEN HOT GAS AND AQUEOUS SOLUTION

DETAILED DESCRIPTION OF THE INVENTION

This invention relates to a heat-transfer apparatus and more particularly to an improved heat-transfer apparatus of the type which comprises a cocurrent flow gas-liquid contacting system for heat-transfer between a high temperature gas and an aqueous solution, most advantageously when the gas and liquid are of a high corrosive nature.

A submerged combustion type evaporator is well known as a conventional apparatus for directly heating or concentrating an aqueous solution (hereinafter referred to simply as a solution), wherein a high temperature combustion gas is brought into direct contact with a solution for transferring the heat of the gas to the solution. Such an apparatus has many applications including, for example, the concentration of dilute sulfuric acid and the quenching of a high temperature gas, etc. Moreover, the submerged combustion type evaporator may be employed in in a process wherein the sensible heat of a high temperature gas is utilized to concentrate inorganic salt solution such as calcium chloride or magnesium chloride solution as described in Japanese Patent Publication No. 20132/1971.

As compared with an indirect heat-transfer heat exchanger in which heat-transfer is accomplished through a fixed heat transferring medium, the submerged combustion type evaporator is advantageously small in size and inexpensive to construct since it allows for a wide selection of corrosion-resistant materials for construction purposes. However, in operation, the submerged combustion type evaporator disadvantageously requires a high operating pressure (usually greater than 2,000 mmH$_2$O). Various types of direct contact heat-transfer systems have been proposed and used including a system wherein a solution is brought into contact with a hot gas in a counter current or cocurrent flow in a tower formed from sufficiently heat-resistant and corrosion-resistant materials. The tower may be either empty or packed with suitable packings materials, but in most cases, there arise problems of deterioration of the material forming the tower due to both abrupt changes in temperature and contact with corrosive liquids or gases. Choking of the tower resulting from deposition and thermal decomposition of a solute in the neighborhood of a high temperature gas inlet causes additional problems, especially when the concentration of a solution within the tower is at or approximates the saturation point. When the temperatures of an introduced gas is 300°C or higher, it is very difficult to continue a stable operation over a long period of time. Though the countercurrent or cocurrent flow direct contact heat exchangers described have, in principles the advantages of the above mentioned submerged combustion system while eliminating certain defects, they do not necessarily give satisfactory results.

It is, therefore, an object of the present invention to provide a direct type heat-exchanging apparatus which overcomes the disadvantages of the prior-art counterparts.

It is a further object of the invention to provide a heat-transfer apparatus wherein a high temperature gas can be continuously treated over a long period of time.

It is a still further object of the invention to provide a heat-transfer apparatus in which a high temperature gas is continuously fed into contact with a dispersed and discontinuous liquid phase in a cocurrent flow in the same manner as in an empty tower, packed tower or venturi scrubber in order to transfer thermal energy to the liquid.

It is another object of the invention to provide a heat-transfer apparatus wherein the problem of deposition of a solute in the vicinity of a solution-injecting port is satisfactorily overcome.

The above objects are attained by a heat-transfer apparatus including means for combusting a material for producing a hot combustion gas, a duct connected to one end of the combustion means, and a cocurrent flow gas-liquid contacting unit hermetically connected to the other end of the duct for receiving the combustion gas the improvement comprising a connecting means interposed between the duct and the contacting unit for hermetically connecting same, a solution-injecting port opening into the contacting unit at a position below the connecting means for injecting an aqueous solution into the contacting unit for direct contact with the hot gas therein, and a water-feeding port positioned above the solution-injecting port.

The water-feeding port may be positioned between the connecting means and the solution-injecting port. With this construction, when the solute of the solution sprayed from the solution-injecting port is deposited on the inner wall surfaces of the contacting unit, it can be washed away by water supplied from the water-feeding port, effectively preventing deposition of the solute.

The invention will be better understood from the following description taken in conjunction with the accompanying drawings in which:

FIG. 1 is a schematic view generally illustrating a heat-transfer apparatus of the present invention; and FIG. 2 is a cross-sectional view illustrating on an enlarged scale a connecting means employed in the present invention.

FIG. 1, shows one embodiment of the heat-transfer apparatus of the present invention to which a combustible material is fed by means of a pump 2 and atomized with steam vapor or compressed air which is supplied from a line 4. The spray thus provided is then mixed with air which is fed by an air blower 3 to the furnace 5 for combustion by a burner 1. The hot gas generated as a result of combustion within the furnace 5 is exhausted through exit 6 at the upper end of the furnace. The combustion gas which has generally a temperature higher than 1,000°C is fed through a hot gas duct 7 to a venturi scrubber 8. The scrubber 8 is employed not as a generally-used wet type dust collector, but as a means for transferring a large amount of heat from the combustion gas to a solution by bringing the combustion gas into contact in a cocurrent flow and in a limited space, with a solution which is fed through a nozzle 17. Accordingly, it is required to have a gas flow rate high enough to transform the solution, which is injected into the gas flow, into fine particles in order both to increase the contacting surface area of the solution, and to vigorously agitate the gas and solution to effectively carry out heat and mass transfer. The venturi scrubber, has a narrow middle or throat portion and widens toward both the upper end through which the hot gas is introduced and the lower end through which the gas-liquid mixture is exhausted. This configuration is considered useful in the present invention because it is simple and effective in structure and function.

Referring to FIG. 2 which depicts a cross-sectional view of the venturi scrubber 8, the inner surface of the wall of the venturi scrubber 15 has a lining 19 of a material such as acid-resistant brick, graphite brick, etc., having satisfactory thermal-resistant and corrosion-resistant properties. The venturi scrubber is described in more detail below.

The mixed gas-liquid flow which is near thermal and mass equilibria is fed through a curved duct 22 to a gas-liquid separation system including a knock-out drum 23. The liquid phase is collected at the bottom of the drum 23, by the vortex in the drum and by the action of a demister 24. Most of the collected solution is re-circulated from a nozzle at the bottom of the drum through a circulation pump 14 to the venturi scrubber. If such re-circulation is repeated, the concentration of the solution is raised due to evaporation of water during operation causing deposition of a solid solute on the scrubber walls, thus resulting in a "choking" of the system. Accordingly, a fresh solution is continuously supplied through a line 20 to the circulation system so as to maintain the concentration of the circulating solution at a constant value. At the same time, an overflow passage 26 positioned on the side of the drum 23 allows for discharge of the collected solution when the solution rises above a predetermined level.

The combustion gas which contains saturated steam vapor and which is separated from the gas-liquid mixture by the knock-out drum 23 is emitted from an exhaust port 25. This combustion gas may be either vented through an exhaust stack, or fed to an absorbing tower or other apparatus for collecting or recovering components existing in the gas.

From the foregoing, the general construction and operation of the apparatus of the invention will be understood. The important features of the present invention will be illustrated in more detail below.

First, the connecting means 9 positioned between the venturi portion and the hot gas duct is made of a material which has excellent thermal resistance and heat conductivity. The material is further required to have sufficient corrosion-resistance so as to prevent corrosion of the wall surfaces of the connecting means when the combustion gas is of a corrosive nature. The connecting means 9 may be of an annular shape and interiorly provided with a circular or annular cooling water jacket 12 into which cooling water is charged through an inlet plug 13 to suitably quench the entirety of the wall or shell of the connecting means. The surface temperature of the inner wall which comes into contact with the hot gas can thus be held far lower than that of the gas itself (for example, the surface temperature falls below 250°C when graphite is used for the shell), thus assuring a long working life for the shell. The shell is hermetically connected to flanged portions 16 of an outer shell 10 of the hot gas duct 7 and the outer shell 15 of the venturi scrubber 8, respectively. The shell of the connecting means 9 serves to hermetically connect the high temperature portion and the wetted low temperature portion of the apparatus as will be described hereinafter. A solution-injecting port 21 is provided in the inner wall of the venturi scrubber immediately below the connecting means 9. The solution is fed to the venturi scrubber through a solution-inlet nozzle 17 which passes through the wall 19. The connecting means 9 is provided with a water-feeding port 18 above the solution-injecting port 21 as shown in FIG. 2. The water-feeding port may be provided separately from the connecting means 9 at a position between the connecting means 9 and the port 21, if desired.

Most of the solution injected from the port 21 is effectively brought into contact with a combustion gas travelling at a high speed within the venturi scrubber. However, a part of the solution is splashed around the injecting port 21 or on the inner wall surfaces above the port 21. The thus splashed solution is heated and evaporated by the hot gas thereby causing deposition of the solute as is or in a thermally decomposed form. Such deposition or accumulation of the solute often results in "choking" of the gas passage. On the wall below the port 21, even if the above phenomenon occurs, the deposited solute will be immediately dissolved since a fresh solution is continuously supplied from the port 21. In order to avoid the above-mentioned deposition or other related problems, the wall surfaces above port 21 on which the solute tends to deposit should be continuously washed with a small amount of water. For this purpose, the water feeding port 18 is required to be located above the solution injecting port 21. Generally, water to be supplied is preferred to be in an amount as small as possible so as not to upset the thermal balance of the entire system. Accordingly, it is preferred to to cool the wall between the water-feeding port 18 and the solution-injecting port 21 so as to prevent unnecessary evaporation of the wash or dissolving water. This requirement is met by the connecting shell construction of the present invention wherein the surface of the connecting shell which is located above the solution-injecting port 21 is sufficiently cooled, and the water-feeding port 18 is positioned immediately above the port 21.

In the particular embodiment shown in FIG. 1, though the dissolving water feeding port 18 is incorporated into the connecting shell 9 and communicated with a cooling water jacket 12 to utilize a part of the cooling water as dissolving water, various modifications are possible, e.g., a porous material, may be used for forming the shell 9 to permit the cooling water of the cooling jacket 12 to pass through the gas jacket wall into the passage. Alternatively the dissolving water feeding port may be formed in the venutri inner wall 19 in the same manner as the solution-injecting port, supplying water by means of another tube system.

As is apparent from the foregoing, the present invention is directed to an improved heat-transfer apparatus comprising a connecting shell for hermetically connecting a hot gas duct to a venturi scrubber type gas-liquid contacting tower, the connecting shell being cooled to maintain the inner surface temperature thereof below a predetermined value, a means for supplying a solution to the venturi scrubber type unit for heat-transfer with a hot gas, and a means for supplying water to inner wall surfaces on which the solution is sprayed in an amount as small as possible for cleaning the solution-sprayed surfaces.

Although any stable aqueous solution may be handled, particular aqueous solutions advantageously applied to the present invention are solutions of such corrosive inorganic salts as calcium chloride, magnesium chloride, ferric chloride, lithium chloride or the like.

The present invention has been described with reference to a venturi scrubber as a gas-liquid contacting system, but in practical applications, any other gas-liquid contacting system may be used if it can supply a hot gas at a speed sufficient for dispersing a supplied solution in the gas and agitating the mixed phase for increasing the contacting area within a relatively narrow space. For example, a simple empty tower or a suitably packed tower with the above-mentioned functions may be used.

The merit of the apparatus of the present invention will be particularly illustrated in the following Example.

EXAMPLE

A high temperature combustion gas which was obtained by burning chlorinated tar discharged from a vinyl chloride monomer production process, in which almost all of the chlorine component was hydrogen chloride, was treated by a process as shown in FIG. 1. A calcium chloride solution was used as the aqueous solution. The resultant condensed calcium chloride solution and an exhaust gas near equilibrium with regard to heat and mass transfer were subjected to the treatments as described in Japanese Patent Publication No. 20132/1971, thereby to finally collect HCl in the form of dry hydrogen chloride gas. Experimental conditions were as follows:

1. Starting chlorinated tar elemental composition:

| | | |
|---|---|---|
| C | 27.1% | by weight |
| H | 3.6 | do. |
| Cl | 69.3 | do. |

2. Heat of combustion of starting chlorinated tar (Higher Calorific Value):
   3100 Kcal/Kg of starting material
3. Air charge (containing pressurized air for spray):
   3.7 $NM^3$/Kg of starting material
   (about 1.5 as an air ratio)

The starting tar was spontaneously combusted under the above conditions to obtain a high temperature combustion gas.

4. Gas composition:

| | | |
|---|---|---|
| $CO_2$ | 11.1% | by volume |
| $H_2O$ | 10.9 | do. |
| $N_2$ | 64.3 | do. |
| HCl | 9.6 | do. |
| $O_2$ | 4.1 | do. |

5. Gas temperature:
   1,430°– 1550°C

The heat transfer between the thus obtained high temperature gas and a calcium chloride solution was conducted by the use of a venturi scrubber type gas-liquid contacting apparatus as shown in FIGS. 1 and 2. Experimental conditions and results were as follows:

6. Material of venturi portion:
   Shell: Soft steel, rubber-lining
   Shell: Graphite brick lining
7. Connecting shell material:
   Made of graphite with jacket
8. Gas speed at venturi throat:
   About 50m/sec. when calculated at a normal temperature under a normal pressure
9. Concentration and charged or discharged amount of solution:
   10.0 kg of about 33 wt. percent calcium chloride solution per kg of chlorinated tar from solution supplying port (20)
   5.6 kg of about 57 wt. percent calcium chloride per kg of chlorinated tar from solution overflow port (26)
10. Amount of circulating solution:
    3.0 – 6.0 kg/kg of introducing gas
11. Exhaust gas temperature:
    about 120°C
12. Exhaust gas composition:

| | | |
|---|---|---|
| $CO_2$ | 5.1% | by volume |
| $H_2O$ | 56.5 | do. |
| $N_2$ | 31.0 | do. |
| HCl | 5.1 | do. |
| $O_2$ | 2.0 | do. |

The thus obtained exhaust gas and concentrated solution were used for collecting hydrogen chloride gas previously described hereinbefore.

It will be understood that numerous modifications may be made by those skilled in the art without departing from the scope of the invention. Therefore, the appended claims are intended to cover all such equivalent variations as come within the true spirit and scope of the invention.

What is claimed is:

1. In a heat-transfer apparatus including combustion means for producing a hot combustion gas, and duct means for receiving said gas, said duct means including a first portion connected to said combustion means and a venturi portion, provided with means extending through the venturi portion of the duct means for injecting a liquid into said venturi portion for direct contact of said liquid with said gas; the improvement comprising connecting means for hermetically connecting said first portion and said venturi portion, said connecting means being provided with a jacket for receiving cooling water; and means for washing the interior of said wall portion adjacent said liquid injection means, said washing means comprising a duct connecting said jacket to said interior wall portion, upstream of said injection means.

2. In a heat-transfer apparatus including combustion means for producing a hot combustion gas, and duct means connected at one end to said combustion means for receiving said gas, a venturi scrubber including means extending through a wall portion of said scrubber for injecting a liquid into said scrubber for direct contact of said liquid with said gas, the improvement comprising means for connecting the other end of said duct means to the inlet of said scrubber, said connecting means being provided with means for water-cooling the portion of the duct immediately preceeding the scrubber and means for washing the interior of said wall portion adjacent said liquid injection means and upstream thereof.

3. The heat-transfer apparatus as set forth in claim 2, wherein the inner walls of said connecting means are lined with or constructed of graphite.

4. A process for scrubbing a gas mixture to separate at least one component thereof, said process comprising:
   passing said gas mixture through a scrubbing means;
   injecting a first aqueous solution containing an inorganic solute into said scrubbing means to absorb at least one component of the gas mixture; and
   injecting water or a second aqueous solution capable of dissolving said solute at a point upstream of the point of addition of said first solution to wash an interior wall portion of the scrubbing means in the vicinity of the point of addition of said first solution.

5. The process of claim 4 wherein said component is hydrogen chloride and said inorganic solute is selected from calcium chloride and magnesium chloride.

* * * * *